United States Patent [19]

Groves

[11] 4,115,700
[45] Sep. 19, 1978

[54] HIGH DENSITY FUEL STORAGE RACKS

[75] Inventor: Malcolm Duane Groves, Suffield, Conn.

[73] Assignee: Combustion Engineering, Inc., Windsor, Conn.

[21] Appl. No.: 784,012

[22] Filed: Apr. 4, 1977

[51] Int. Cl.$^2$ .............................................. G21F 5/00
[52] U.S. Cl. ....................................... 250/518; 250/507
[58] Field of Search ............... 250/515, 518, 506, 507; 176/87, 84, 85, DIG. 2

[56] References Cited

U.S. PATENT DOCUMENTS

| | | | |
|---|---|---|---|
| 3,780,306 | 12/1973 | Anderson et al. | 250/507 |
| 3,845,315 | 10/1979 | Blum | 250/518 |
| 4,039,842 | 8/1977 | Mollon | 250/518 |
| 4,042,828 | 8/1977 | Rubinstein et al. | 250/507 |
| 4,044,267 | 8/1977 | Bevilacqua | 250/518 |

FOREIGN PATENT DOCUMENTS 1,169,851  11/1969  United Kingdom ..................... 250/518

Primary Examiner—Alfred E. Smith
Assistant Examiner—B. C. Anderson
Attorney, Agent, or Firm—Lombro J. Ristas

[57] ABSTRACT

An apparatus for the safe and compact storage of nuclear fuel assemblies in an array of discrete open-ended neutron absorbing shields for which the theoretical minimum safe separation distance and cell pitch are known. Open-ended stainless steel end fittings are welded to each end of each shield and the end fittings are welded to each other in side-by-side relation, thereby reducing the cell pitch tolerance due to fabrication uncertainties. In addition, a multiplicity of ridges on the sides of each shield having a height equal to one half the theoretical minimum safe separation distance further reduce shield bowing tolerances. The net tolerance reduction permits a significant increase in the number of fuel assemblies that can be safely contained in a storage area of fixed size.

16 Claims, 5 Drawing Figures

HIGH DENSITY FUEL STORAGE RACKS

BACKGROUND OF THE INVENTION

The present invention relates to an apparatus for the safe and compact storage of nuclear reactor fuel assemblies.

It is well known to safely and efficiently store nuclear reactor fuel assemblies in a uniform array of discrete shield units by supporting the units in a rigid structure that maintains a safe separation distance under normal and seismically perturbed conditions. It is essential that the safe separation distance be maintained between every fuel assembly and each adjacent assembly in order to avoid a critical geometry. The crucial dimensions in fuel storage rack design are the cell pitch, which is the distance between corresponding points in adjacent cells of the array of shields, and the separation distance, which is the distance between adjacent shield units.

The special areas devoted to storing nuclear fuel assemblies within nuclear power plants were designed under the assumption that spent fuel would be stored for only a few years before shipment to reprocessing plants. Recently the need has arisen to store many more fuel assemblies on site. Thus, recent prior art discloses several fuel storage racks designed to decrease the safe cell pitch from over 50 centimeters down to less than 28 centimeters which for typical commercial pressurized water reactor fuel provides storage capacity for more than 12 fuel cycles. For example, U.S. Pat. No. 4,004,154 and U.S. Pat. No. 4,044,267 disclose an apparatus that uses the principle of the neutron flux trap for the safe yet compact storage of the fuel assemblies in discrete stainless steel or borated stainless steel shield units. This inventive concept can be used to minimize the theoretical cell pitch and separation distance (therein called neutron attenuation distance) for a given effective U-235 enrichment of the fuel in the assembly, regardless of the shield unit material.

Since the degree of subcriticality, and hence safety, of an array of stored fuel assemblies is not usually measured in the field, very precise and detailed criticality calculations are used to assure the safety of a particular storage rack design. Such calculations are typified by the curves in FIG. 4 of U.S. Pat. No. 4,044,267 which show minimum safe separation distance as a function of effective enrichment based on calculations made under the assumption that there are no uncertainties in the shield unit dimensions and spacing. The nominal design values of the crucial dimensions of the manufactured racks additionally include the following allowances:
 a. geometric changes resulting from seismic disturbances,
 b. tolerance on the dimensions of the shield unit,
 c. tolerance on the squareness of the rigid structure supporting the shield units,
 d. tolerance on the location of the shield unit with respect to the support structure,
 e. bowing of the shield between structural support points. Thus the storage capability of a fuel rack design not only depends on how efficiently the shield units can be theoretically configured to minimize the reactivity of the array, but also on the degree to which the design of the supporting structure, the manufacturing tolerances, and the construction tolerances necessitate increasing the theoretical minimum dimensions to obtain nominal dimensions used for manufacturing. Typical prior art structures require allowance for items a - e above of about 1.5 centimeters.

Discrete shielding units are also commercially available in the form of a strong neutron absorber, boral, (which contains boron carbide in aluminum) sandwiched between inner and outer layers of stainless steel or aluminum. The boral is not permanently bonded between the stainless layers but is held in place primarily by means of a plurality of small horizontal ridges. These shields can be used in conjunction with the flux trap principle for minimizing the separation distance between shields. The commercial literature shows a structural support framework for an array of boral shield units consisting of multiple levels of grids into which the units are loosely inserted. Although the safe cell pitch for the boral type shield units is generally smaller than the cell pitch for the boron stainless units, prior art structures for supporting the boral shields also require that significant allowance be added to the theoretical minimum cell pitch in order to determine the nominal dimensions of the rack.

SUMMARY OF THE INVENTION

It is an object of the present invention to reduce the tolerances associated with the fabrication of fuel storage racks that use a discrete neutron absorbing shield to perimetrically surround each fuel assembly.

It is another object of the invention to provide a fuel assembly storage structure whereby seismic loadings borne by the storage shields will be greatly reduced.

It is a further object of the invention to minimize the number of welds between the support structure and the shields.

Accordingly, the present invention accomplishes these objectives by attaching to each end of each neutron absorbing shield unit a stainless steel end fitting having a carefully controlled outer dimension essentially equal to the theoretically minimum cell pitch between shield units. The end fittings are welded together in side-by-side relation producing a structure having uniform spacing of the shields. In addition, the sides of the shields are ridged such that the outer shield surfaces of any two adjacent shield units are prevented, by the contact of the ridges, from coming closer together than the theoretical safe minimum separation distance. Thus, by eliminating much of the structural framework characteristic of prior art racks and the consequent tolerances associated with the relationship between the shields and the structures, the nominal cell pitch can more closely approach the theoretical minimum cell pitch.

It can also be appreciated that in the present invention, the brunt of any lateral loads on the rack will be borne by the end fittings rather than the shields. This permits the use of thinner, less expensive shields. Also, since the commercially available boral shields have very thin stainless or aluminum outer liners, welding these shields directly to a support structure is difficult. The present invention eliminates the need for most such welds while, as discussed above, improving the tolerances. In addition, the junction of the end fitting to the boral shields insulates the boral material within the shield from the potentially corrosive effects of the fuel pool water.

The present invention can reduce the cell pitch tolerance allowance on the prior art flux trap structures from 1.50 centimeters to 0.45 centimeters, thereby reducing the nominal boron steel cell pitch for fuel having an effective U-235 enrichment of 3.7 weight percent from 26.85 centimeters to 25.80 centimeters. This difference translates into an 8 percent increase in storage density, or a one year increase in storage capability.

BRIEF DESCRIPTION OF THE DRAWINGS

The present invention may be better understood in view of the accompanying drawings wherein like reference numerals refer to like elements in the several figures.

DESCRIPTION OF THE PREFERRED EMBODIMENT

The practice of the invention that permits a very high density of stored fuel assemblies employs boral interposed between inner and outer liners of stainless steel or aluminum. The following description of the preferred embodiment will refer to the boral shield material, but it should be understood that stainless steel, stainless steel containing natural boron dispersed therethrough, or other material having similar neutron absorption and structural properties may also be used with the present invention.

Figure 1:
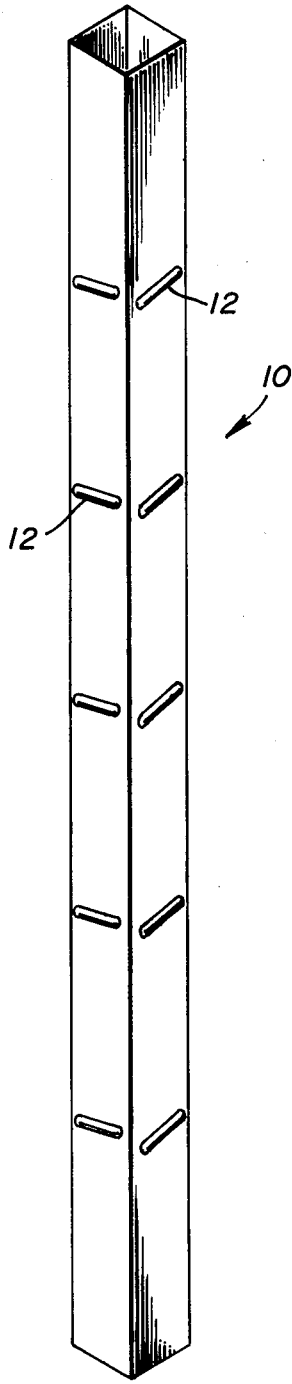
FIG. 1 is an isometric view of a neutron absorbing shield unit.

FIG. 1 shows a discrete shield unit 10 having a square inner cross-section sized to receive and perimetrically encircle a fresh or spent fuel assembly. In a typical application the fuel assembly is 4.0 meters long and 20.6 centimeters square. The shield unit 10 is approximately 4.2 meters high and has an inner dimension of 21.6 centimeters square. For fuel assemblies having a different shape, the shield will have a correspondingly different cross-section.

On the outer surface of each side of the shield, a series of outwardly protruding ridges 12 are formed. The ridges are usually produced by deforming the inner side of the shield surface but the actual method used is not relevant to the invention. The ridges are preferably oriented obliquely to the axis of the shield and each shield has its ridges at approximately the same elevations. The number of axially disposed ridges on each shield will depend on the inherent strength of the shield material used and on the magnitude of the seismic forces required to be accommodated by the storage rack. It is expected that most designs will contain between 5 and 15 ridges on each side of every shield.

Figure 2:
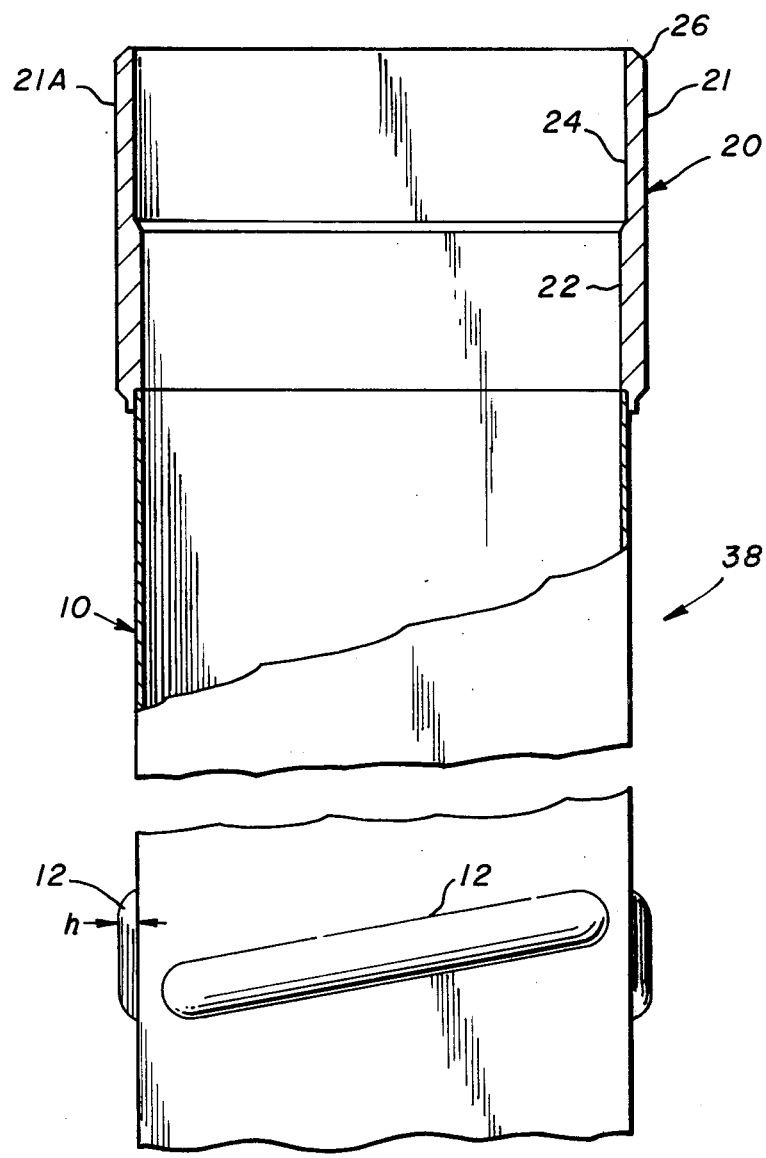
FIG. 2 is a cross-section view of a shield unit and end fitting welded thereto.

Referring now to FIG. 2, the details of each ridge 12 can be more readily understood. Each ridge 12 is approximately 2.5 centimeters wide and extends substantially across the full width of the side of the shield unit 10. Over most of its length, each ridge 12 extends above the side of the shield unit 10 a distance $h$ equal to one half the theoretical minimum safe separation distance between shield units as determined by calculation or experiments not forming a part of this invention. A stainless steel end fitting 20 is welded to each end of the shield unit 10. The end fitting 20 is open at both ends and is adapted at its lower end 22 to mate with the upper end of the shield unit 10. The upper portion of the end fitting 24 has a thinner wall than the lower portion 22 to which is welded the shield unit 10 in order to minimize any distortion effects on the squareness of shield unit 10 when, as discussed below with reference to FIG. 5, several end fittings 20 are welded together in side-by-side relation. Over a substantial portion of the end fitting 20 that extends above the shield unit 10, the distance between outside surfaces 21 and 21A is carefully controlled to equal the nominal minimum safe cell pitch of the fuel storage rack array. This nominal cell pitch is equal to the theoretical minimum safe cell pitch determined by methods unrelated to this invention plus a cell pitch tolerance allowance. This tolerance takes into account the tolerance on the end fitting outside dimension 21-21A, the allowance for bowing of the shield unit before the ridges 21 come into contact, and the tolerance on the accuracy with which the shield unit 10 is squarely centered within the end fitting 20. The preferred embodiment typically results in a total tolerance allowance of 0.45 centimeters added to the theoretical safe cell pitch.

Figure 3:
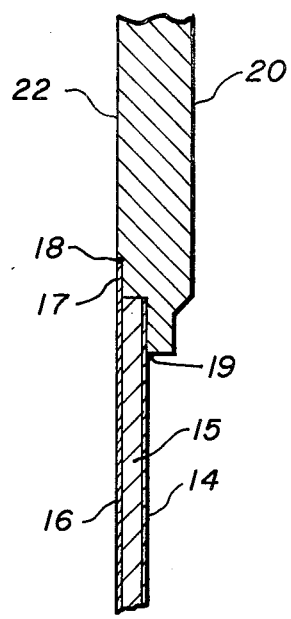
FIG. 3 is a detailed cross-section view of the weld joint between a stainless steel end fitting and a stainless steel clad boral shield.

FIG. 3 shows the precise fit between the lower portion of the end fitting 22 and the shield unit 10. In the preferred embodiment wherein boral 15 is sandwiched between stainless steel liners 14 and 16, the welding of the shield 10 to the end fitting 20 requires special treatment relative to the welding of a solid stainless shield unit 10 due to the relatively thin stainless layers 14 and 16, and the desire to adequately isolate the boral from the water in which the apparatus will usually be used. Thus the shield inner liner 16 has a slightly extended portion 17 which mates directly with the lower inside portion 22 of the stainless steel end fitting. Welds 18 and 19 are then made to secure the end fitting 20 to the shield unit 10. The weld joint between the shield unit 10 and the end fitting 20 is thereby made without significantly distorting the squareness of shield unit 10.

Figure 4:
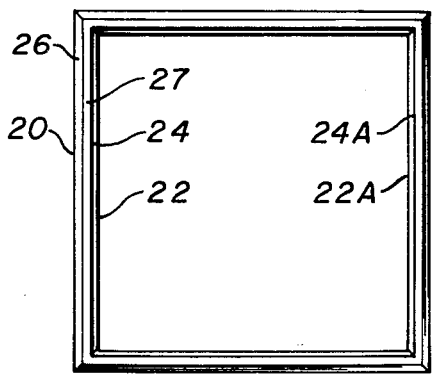
FIG. 4 is a plan view taken along line 4—4 of FIG. 2.

FIG. 4 shows the top of the end fitting 20 attached to the shield unit which is hidden from view. The outer edge 26 is chamfered upward to a flat region 27 having an open cross-section 24 - 24A of slightly larger dimension than the lower inside portion of the end fitting 22 - 22A which is equal in cross-section to the inside cross-section of the shield unit 10. A shield unit 10 with attached end fitting 20 will be referred to as a cell unit.

Figure 5:
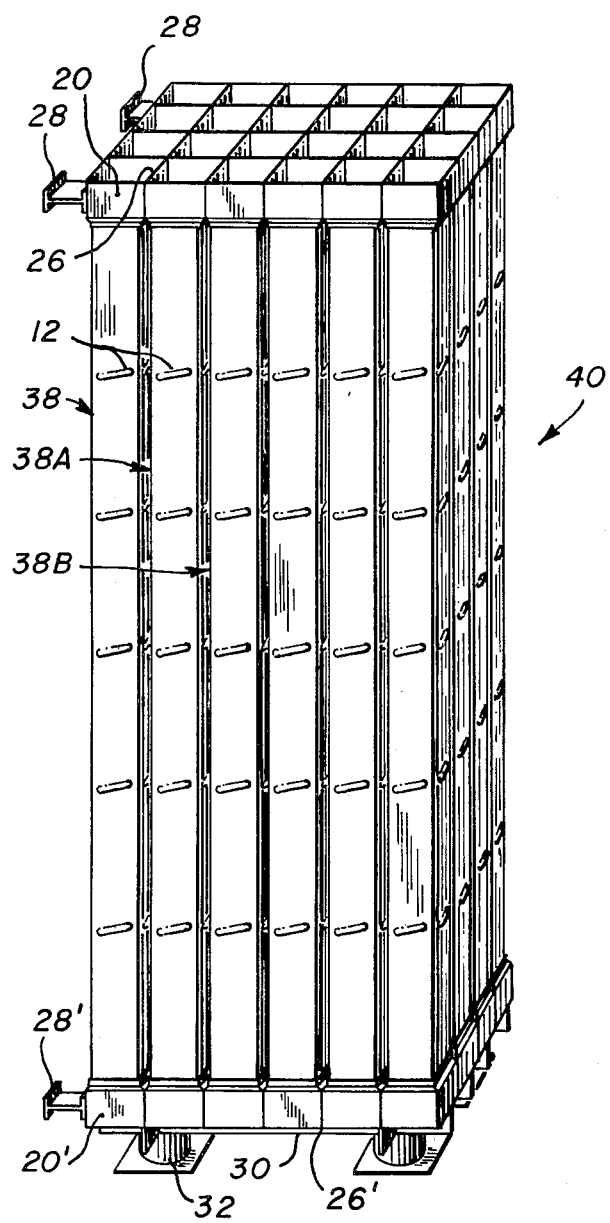
FIG. 5 is an isometric view of a group of shields welded together into a fuel storage rack module.

FIG. 5 shows a fuel storage rack module 40 consisting of a uniform array of cell units 38. The module 40 is constructed by first bringing two cell units 38, 38A into side-by-side relation such that the upper end fitting of cell unit 38A is flush and square against the upper end fitting 20 of cell unit 38, and the lower end fitting of cell unit 38A is flush and square against end fitting 20' of cell unit 38. Cell units 38 and 38A are then welded to each other along chamfered top edges 26 and bottom edges 26' on the respective end fittings. This process is repeated by welding cell unit 38B to cell unit 38A along the chamfered edges of the top and bottom end fittings. The process is continued until the complete module 40 of the desired array size is completed. The completed module 40 is then placed on a base 30 which forms no part of the invention and which can be designed and constructed by a person of ordinary skill in the art. The base 30 is supported by pedestals 32 in a manner that enables the natural circulation of coolant through the base 30 and up through the cell units 38. The lower end fittings 20, the base 30 and the pedestal 32 can be welded or rigidly attached by any other convenient means.

A typical fuel storage area will contain a plurality of fuel rack modules 40. The modules can be attached to each other in the same way that cell units are attached as described above. Additional seismic stability can be provided for the array of modules by attaching to the end fittings 20 and 20' on one or more cell units 38 that face the fuel storage area wall, strut members 28, 28' which will provide rigid support between the module 40 and the wall.

If particularly high seismic loads must be accommodated in the design of the fuel storage modules 40, additional structural stability can be provided on each cell unit 38 by using two shield units 10 and three end fittings 20 per cell unit 38. This is done by segmenting the shield unit 10 into two parts connected in the center with a modified end fitting adapted to engage at both ends the shield unit 10 as shown in FIG. 3. Strut 28 can then be attached to these middle end fittings to provide additional lateral seismic support.

As described above, the preferred embodiment includes welding the end fittings 20 of the cell units 38 together to form a module, which is then attached to the base 30. This welding is usually done in the shop rather than in the field. An alternate embodiment of the invention, not shown, contemplates that the individual cell units 38 will be shipped to the site and there rapidly assembled into modules. If rapid assembly is desired, an array of cell units 38 can be firmly held together as a module 40 by wrapping around the perimeter of all abutting end fittings 20, 20' a belt that can be tensioned. The resulting module can be attached to the base 30 in any convenient manner. This method of practicing the invention may also be desirable where the seismic loading is small or where rearrangement or replacing of cell units is anticipated.

After all modules 40 are in place in the fuel storage area, the area is typically filled with water. Water is usually used because it is a relatively inexpensive cooling medium, but the present invention can be used in any medium so long as the theoretical minimum safe separation distance between shields in that medium is known.

What is claimed is:

1. An apparatus for the safe and compact storage of a plurality of nuclear fuel assemblies within a plurality of adjacent discrete neutron absorbing open-ended shields disposed in side-by-side relationship each one of which is adapted to perimetrically encircle one of each of the nuclear fuel assemblies, wherein the theoretical minimum safe separation distance between shields is known, comprising:
    a. a plurality of said shields, each having at several positions along its entire perimeter a plurality of axially spaced, outwardly protruding ridges, the heights of which are approximately one-half said separation distance, whereby contact of the ridges on adjacent shields will prevent adjacent shields from coming closer together than said separation distance;
    b. a plurality of shield end fittings one of each of which is attached to each end of each of said shields, having an open center cross-section at least as large as the open cross-section of said shields and having a polygonal perimeter with an outer dimension between opposite sides of said end fitting being at least equal to the perpendicular distance between the maximum heights of said ridges on opposite sides of said shields; and
    c. means for securing firm and rigid contact between each of said end fittings and all immediately adjacent end fittings in side-by-side relationship therewith.

2. The apparatus of claim 1 wherein said ridges are oriented obliquely relative to the longest axis of said shields.

3. The apparatus of claim 2 wherein said ridges are formed by deformation of the sides of said shields.

4. The apparatus of claim 2 wherein said ridges are rigidly attached to the sides of said shields.

5. The apparatus of claim 2 wherein the material of said shields is stainless steel containing boron dispersed therethrough.

6. The apparatus of claim 2 wherein the material of said shields comprises a strong neutron absorber sandwiched within inner and outer metallic linings.

7. The apparatus of claim 2 wherein:
    a. said end fittings are made from stainless steel; and
    b. said means comprise a weldment of said end fittings along abutting sides.

8. The apparatus of claim 2 wherein said means comprise:
    a. a belt wrapped around the perimeter of said plurality of end fittings in side-by-side relationship at each end of said plurality of shields; and
    b. means for tightening said belts to a desired tension.

9. The apparatus of claim 2 wherein:
    a. said shield has a square inner and outer cross-section taken around a portion of said shield that does not contain said ridges, the material of said shield and ridges being stainless steel containing boron dispersed therethrough and said ridges being formed by deformation of each side of said shields;
    b. said end fittings are made from stainless steel and have a first end of square inside cross-section fitted over one end of said shield and welded thereto, and a second end of square outer cross-section and a slightly chamfered outer edge; and
    c. said means comprises weldment between said end fittings and adjacent end fittings along said chamfered edge.

10. An apparatus for the safe and compact storage of a plurality of rectangular nuclear fuel assemblies within a plurality of adjacent discrete neutron absorbing open ended rectangular shields, each shield made from a sandwich material having metallic outer and inner liners and a central region of strong neutron absorber, the shields being disposed in side-by-side relationship each one of which is adapted to perimetrically encircle one of each of the nuclear fuel assemblies, wherein the theoretical minimum safe separation distance between shields is known, comprising:
    a. a plurality of said shields, each having a plurality of axially spaced, outwardly protruding ridges at substantially the same elevations on every side thereof, the heights of the ridges being approximately one-half said separation distance, whereby contact of the ridges on adjacent shields will prevent adjacent shields from coming closer together than said separation distance, the inner lining of said shields being slightly axially extended relative to the central region of said shield;
    b. a plurality of rectangular shield end fittings one of each of which is attached at its first end to each end of each of said shields, said fitting having an open center cross-section at least as large as the open cross-section of said shields and having an outer dimension between opposite sides of said fitting being at least equal to the perpendicular distance between the maximum heights of said ridges on opposite sides of said shields, the first end to which said shield is attached forming first and second steps into which the inner liner and central region mate, the attachment of said shields to said first ends including a weld between the axially extended portion of said inner lining and said end fitting; and c. means for securing firm and rigid contact between each of said end fittings and all immediately adjacent end fittings in side-by-side relationships therewith.

11. The apparatus of claim 10 wherein the material of said shield comprises a strong neutron absorber sandwiched within inner and outer liners of stainless steel.

12. The apparatus of claim 10 wherein the material of said shield comprises a strong neutron absorber sandwiched within inner and outer liners of aluminum.

13. The apparatus of claim 11 wherein said strong neutron absorber contains boron carbide and aluminum.

14. An apparatus for the safe and compact storage of a plurality of nuclear fuel assemblies within a plurality of adjacent discrete neutron absorbing open-ended shields disposed in side-by-side relationship each one of which is adapted to perimetrically encircle one of each of the nuclear fuel assemblies, wherein the theoretical minimum safe cell pitch between shields is known, comprising:

a. a plurality of said shields;
b. a plurality of shield end fittings one of each of which is attached at its first end to each end of each of said shields, said end fittings having an open center cross-section at least as large as the open cross-section of said shields, and having a polygonal perimeter with an outer dimension between opposite sides approximately equal to said theoretical minimum safe cell pitch; and
c. means for securing firm and rigid contact between each of said end fittings and all immediately adjacent end fittings in side-by-side relationship therewith.

15. The apparatus of claim 14 wherein a substantial portion of the polygonal sides of the outer perimeter of said fittings are flat and vertical.

16. The apparatus of claim 15 wherein a substantial axial portion of the first end of said fitting is thicker than the other end of said fitting, and wherein said means includes weldment between said other end of said fitting and the corresponding said other end of adjacent fittings.

* * * * *

UNITED STATES PATENT OFFICE
CERTIFICATE OF CORRECTION

PATENT NO. : 4,115,700

DATED : September 19, 1978

INVENTOR(S) : Malcolm Duane Groves

It is certified that error appears in the above-identified patent and that said Letters Patent are hereby corrected as shown below:

Column 1, line 61 after "points." begin a new paragraph, this paragraph begins with "Thus the storage......."

Column 4, line 17 after "ridges" change "21" to --12--

Signed and Sealed this

Twentieth Day of February 1979

[SEAL]

Attest:

RUTH C. MASON
Attesting Officer

DONALD W. BANNER
Commissioner of Patents and Trademarks